United States Patent
Bae

(10) Patent No.: US 6,912,404 B2
(45) Date of Patent: Jun. 28, 2005

(54) METHOD FOR CONTROLLING POWER IN A RADIO COMMUNICATION SYSTEM USING RATIOS OF SIGNALS TO NOISE AND POWER

(75) Inventor: Jae-Seong Bae, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 545 days.

(21) Appl. No.: 09/810,125

(22) Filed: Mar. 16, 2001

(65) Prior Publication Data

US 2001/0031643 A1 Oct. 18, 2001

(30) Foreign Application Priority Data

Apr. 7, 2000 (KR) ......................................... 2000-18240

(51) Int. Cl.$^7$ ................................................ H04Q 7/38
(52) U.S. Cl. ........................ 455/522; 455/69; 370/318
(58) Field of Search ......................... 455/522, 69, 453, 455/13.4, 318; 370/318

(56) References Cited

U.S. PATENT DOCUMENTS 5,839,056 A * 11/1998 Hakkinen .................... 455/69
6,556,839 B1 * 4/2003 Kondo ....................... 455/522
6,690,944 B1 * 2/2004 Lee et al. ................... 455/522

* cited by examiner

Primary Examiner—Nick Corsaro
(74) Attorney, Agent, or Firm—Dilworth & Barrese, LLP

(57) ABSTRACT

A method for accurately controlling power in a radio communication system is disclosed. The method comprises the following steps: measuring a ratio of noise-to-power in a signal received from a terminal; measuring received power and estimating a ratio of noise-to-power and received power by using the received signal; and comparing the estimated ratio of noise-to-power and received power with a predetermined threshold value to determine a power control bit (PCB).

5 Claims, 3 Drawing Sheets

METHOD FOR CONTROLLING POWER IN A RADIO COMMUNICATION SYSTEM USING RATIOS OF SIGNALS TO NOISE AND POWER This application claims priority to an application entitled "METHOD FOR CONTROLLING POWER IN WIRELESS COMMUNICATION SYSTEM" filed with the Korean Industrial Property Office on Apr. 7, 2000 and assigned Ser. No. 2000-18240, the contents of which are hereby incorporated by reference.

BACKGROUND OF THE INVENTION

1. Field of the Invention

The present invention relates generally to a method for controlling power in a radio communication system, and more particularly a method for controlling power in a CDMA (Code Division Multiple Access) telecommunications system.

2. Description of the Related Art

Radio communication systems control power according to two methods, such as Forward Link Power Control and Reverse Link Power Control. Generally, in such power control the distance of a terminal from a base station is varied as the terminal moves and thus control thereon is required. Even if the terminal remains in the same position, power control between the mobile terminal and the base station is required as other mobile substances constantly change an environment of radio channels. The base station and the terminal can process received signals and reduce error rate more effectively via power control. Now, performing reverse power control in a CDMA system with reference to FIG. 1 and FIG. 2 will be described.

FIG. 1 is a block diagram illustrating reverse closed loop power control in a CDMA system according to the related art. FIG. 1 is provided only for showing a configuration for reverse closed loop power control. The reference numeral 10 designates only a section for power control in the base station in a function block. The reference numeral 20 designates only a section for power control in the terminal in a function block.

A noise-to-power ratio measuring unit 12 in the base station inspects a ratio of noise-to-power of the received signal and outputs the measured value. Such output data is outputted to a PCB determining unit 14 for determining a PCB (Power Control Bit). The PCB determining unit 14 uses the received signal to determine the PCB and outputs the determined PCB to a data transmission unit 16. The data transmission unit 16 transmits the bit for controlling power of the data via a power control sub-channel Since the signal is transmitted under a radio environment, noise and delay take place in the channel. Such delay can be expressed as noise, and addition of noise can be simplified as being processed in an adder 18. Therefore, noise is added in the adder 18 to be inputted to a PCB detecting unit 22 of the terminal.

The PCB detecting unit 22 receives the signal transmitted on the radio environment and detects the PCB from the received signal. The signal detected is input to a transmission power adjusting unit 24. The transmission power adjusting unit 24 controls power subject to transmission according to the received value. In other words, the terminal 20 power controls data subject to transmission based upon the received power control bit, and transmits data of the power controlled value to the base station. Accordingly, the base station receives and processes the signal synthesized with noise.

FIG. 2 is a flow chart illustrating a power control process in the base station according to the related art. Herein below, the power control process in the base station according to the related art will be described with reference to FIG. 1 and FIG. 2.

In step 100, the noise-to-power ratio measuring unit 12 of the terminal 10 receives the signals transmitted via the radio environment to measure the ratio of noise-to-power, which is later output to the PCB determining unit 14. Then in step 102, the PCB determining unit 14 compares the measured value with a predetermined threshold value. If the measured value is smaller than the threshold value, the process proceeds to step 104 to determine the PCB to be decreased. If the measured value is at least the threshold value, the process proceeds to step 106 to determine the PCB to be increased. Upon such determination, the data transmission unit 16 transmits the determination to the terminal via the transmission channel in the radio environment.

Such power control is carried out in one, two or three kinds of step sizes. In other words, the amount of variation in power control is carried out within the predetermined one, two or three steps. However, time delay takes place according to the distance between the radio terminal and the base station when the foregoing bit is power transmitted. This time delay, essentially, takes place in proportion to distance between the radio terminal and the base station. Also, time is required for treating the time delay between the base station and the terminal, resulting in further delay in addition to the transmission time delay. Such an error in power control is a factor that reduces radio conversation qualities.

SUMMARY OF THE INVENTION

It is, therefore, an object of the present invention to provide a method for controlling power in a radio communication system that can minimize errors in power control, and more particularly errors associated with time delay.

To obtain the foregoing object of the invention, a method for controlling power in a radio communication system is provided. The method comprises the following steps: measuring a ratio of noise-to-power in a received signal from a terminal; measuring received power and estimating a ratio of noise-to-power thereof by using the received signal; and comparing the estimated ratio of noise-to-power with a predetermined threshold value to determine a PCB. The power is estimated by using a polynomial or a linear function.

Furthermore, the method can further comprise the step of determining power of a received signal containing data according to the estimated power value, in which the data is transmitted from a base station.

BRIEF DESCRIPTION OF THE DRAWING

The above and other objects, features and advantages of the present invention will become more apparent from the following detailed description when taken in conjunction with the accompanying drawings, in which.

DETAILED DESCRIPTION OF A PREFERRED EMBODIMENT

Figure 1:
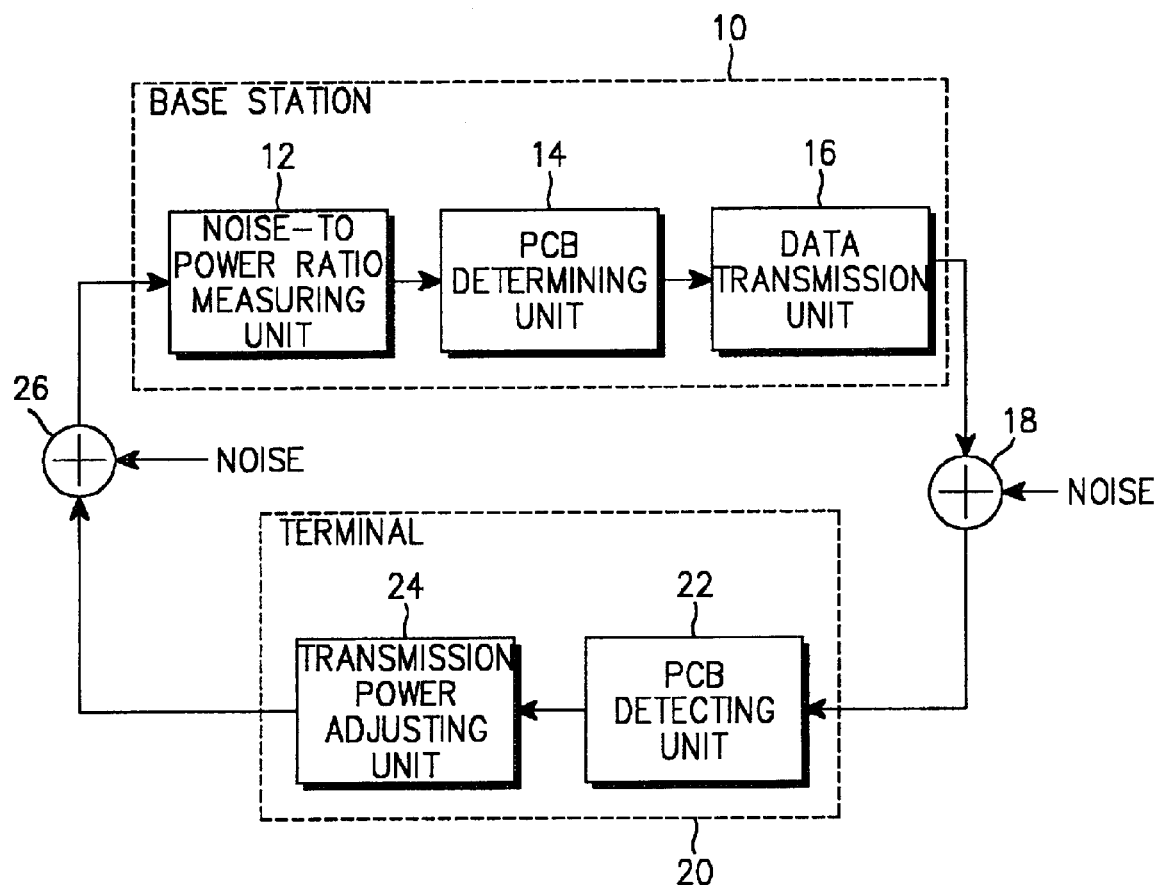
FIG. 1 is a block diagram illustrating reverse closed loop power control in a CDMA system according to the related art.
Figure 2:
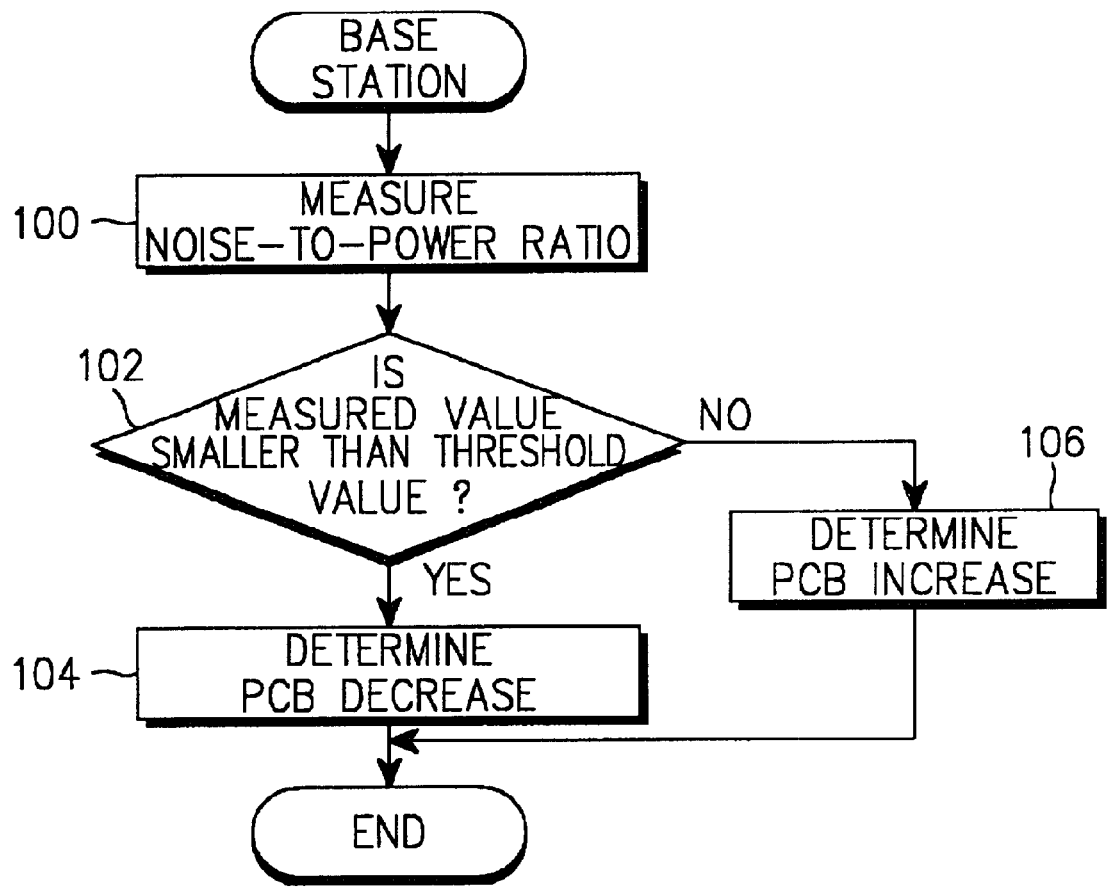
FIG. 2 is a flow chart illustrating a power control process in the base station according to the related art.

Hereinafter, the present invention will be described in detail with reference to the appended drawings. Like elements are referred to by like reference numerals even if shown in different drawings.

Figure 3:
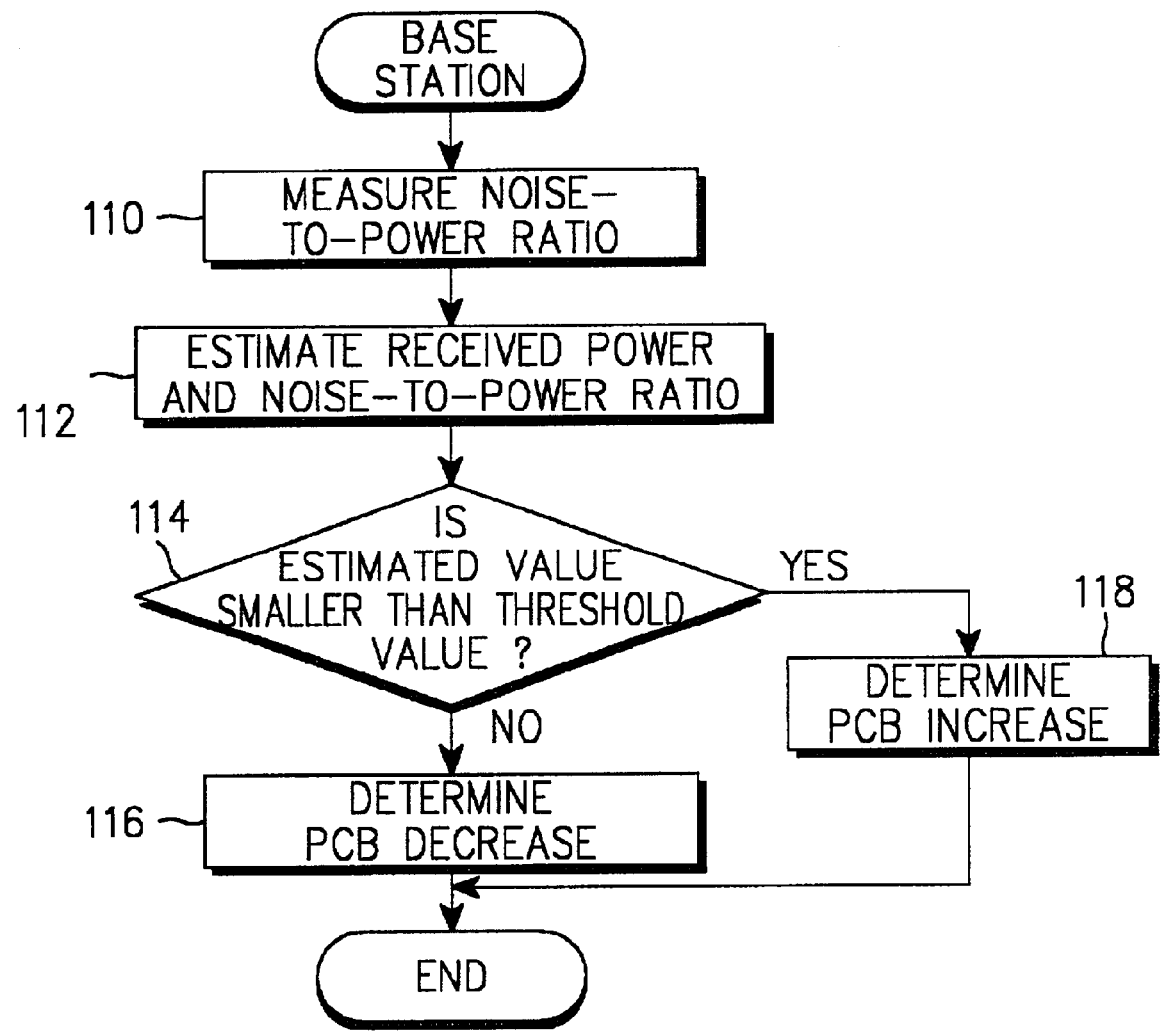
FIG. 3 is a flow chart illustrating a process to power control a terminal in a base station according to the present invention.

FIG. 3 is a flow chart illustrating a process to power control a terminal in a base station according to the present invention. Hereinafter, the power control process of the invention will be described in detail with reference to FIG. 3.

First, in a base station 10, configured as in FIG. 1, a PCB determining unit 14 estimates a ratio of noise-to-power and received power. While a section for estimating the noise-to-power ratio can be configured separately from that in FIG. 1, it is described in the embodiment as assumed that the PCB determining unit 14 performs the estimation. Also, a terminal 20 has the configuration as shown in FIG. 1. Therefore, the embodiment of the present invention in FIG. 3 will be described by using the configuration disclosed in FIG. 1.

In step 110, a noise-to-power ratio determining unit 12 of the base station receives a signal transmitted from the terminal via a medium in a radio environment, and measures the ratio of noise-to-power from the received signal. The value measured in the noise-to-power ratio determining unit 12 is inputted into the PCB determining unit 14. Then, the PCB determining unit 14 estimates the ratio of noise-to-power and received power in step 12. The estimation can be carried out according to the following equation 1:

$$P_{t_2} = \frac{P_{t_1} - P_{t_0}}{t_1 - t_0} \cdot (t_2 - t_0) + P_{t_0}. \qquad \text{Equation 1}$$

Herein, $P_{t1}$ is power of the received signal at time $t_1$. The measured time of previously received signals are $t_0$ and $t_1$, and $t_2$ is the estimated time of the received signal. While in the present embodiment the foregoing equation 1 is expressed as a linear polynomial, the equation can be expressed as a second or third polynomial or even a higher Nth polynomial ($P_{t1}$, $P_{t2}$, $P_{t3}$, ..., $P_{tN}$). In other words, as the order of the polynomial increases, the previously measured power values are reflected in a larger amount.

Upon estimating, the PCB determining unit 14 compares the estimated ratio of noise-to-power with the threshold value in step 114. A result of measuring in step 114, the PCB determining unit 14 proceeds to step 116 if the threshold value is greater than or equal to the estimated value, and proceeds to step 118 if the threshold value is smaller than the estimated value. In other words, the process proceeds to step 118 if a power increase is required in the estimated situation, and to step 116 if a power decrease is required in the estimated situation.

The PCB determining unit 14 performs a PCB increase determining step and inserts this into data to be transmitted when a power increase is required and the process proceeds to step 118. Here, the PCB determining unit 14 can also be configured to transmit data with increased power via control of the data transmission unit 16. In other words, power can be increased in transmission as much as the determined power increase of the terminal requires.

Although unlikely, the PCB determining unit 14 determines PCB decrease when a power increase is not necessary and the process proceeds to step 116. The PCB determining unit 14 inserts the measured PCB into data transmitted via the data transmission unit 16. Also, the PCB determining unit 14 may control the data transmission unit 16 so that the data and the PCB may be transmitted with decreased power as much as the determined power decrease is required.

As described herein above, when the PCB is determined by using the determined data and transmitted via the radio environment in step 116 and 118, the terminal 20 receives the PCB to perform increase or decrease of power according to the received PCB.

The embodiment above has been described in a case where the estimation of power control is performed in general. In other words, on the assumption that the power control is performed by transmitting a command of a power increase or decrease. It will be apparent to those skilled in the art that a method via estimation can also be used in a system in which power control can be maintained.

As power control is performed on the radio system by using the estimated value as described herein above, there is an advantage that a more accurate power control can be performed. Another advantage is that conversation qualities can be improved via correct power control.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling power in a radio communication system, comprising:

measuring a ratio of noise-to-power in a received signal from a terminal;

measuring received power;

estimating a ratio of noise-to-power and received power during a power control operation of the terminal by using signals received from a previous predetermined time to a present time; and comparing the estimated ratio of noise-to-power and received power with a predetermined threshold value to determine a power control bit (PCB).

2. A method for controlling power in a radio communication system according to claim 1, wherein the ratio of noise-to-power and received power is estimated by using a polynomial.

3. A method for controlling power in a radio communication system according to claim 1, wherein the ratio of noise-to-power and received power is estimated by using the following equation:

$$P_{t_2} = \frac{P_{t_1} - P_{t_0}}{t_1 - t_0} \cdot (t_2 - t_0) + P_{t_0}$$

wherein $P_{ti}$ is power of the received signal at time $t_i$, $t_0$ and $t_1$ are measured times of previously received signals, and $t_2$ is the estimated time of the received signal.

4. A method for controlling power in a radio communication system according to claim 1, further comprising the step of determining power of a received data signal according to the estimated power value of the data signal being transmitted from a base station.

5. A method for controlling power in a radio communication system according to claim 1, wherein a mobile terminal receives the PCB determined by comparing the estimated ratio of noise-to-power and received power with a predetermined threshold value and performs an increase or decrease of power accordingly thereto.

* * * * *